United States Patent
You et al.

(10) Patent No.: US 11,976,224 B2
(45) Date of Patent: May 7, 2024

(54) PRESSURE-SENSITIVE ADHESIVE AND LIQUID CRYSTAL CELL

(71) Applicant: LG Chem, Ltd., Seoul (KR)

(72) Inventors: Jung Sun You, Daejeon (KR); Dong Hyun Oh, Daejeon (KR); Jin Hong Kim, Daejeon (KR); Jung Woon Kim, Daejeon (KR); Min Jun Gim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/008,230

(22) PCT Filed: Jul. 2, 2021

(86) PCT No.: PCT/KR2021/008411
§ 371 (c)(1),
(2) Date: Dec. 5, 2022

(87) PCT Pub. No.: WO2022/005244
PCT Pub. Date: Jan. 6, 2022

(65) Prior Publication Data
US 2023/0279279 A1    Sep. 7, 2023

(30) Foreign Application Priority Data
Jul. 2, 2020    (KR) .................. 10-2020-0081286

(51) Int. Cl.
C09J 183/04    (2006.01)
G02F 1/1339    (2006.01)
(Continued)

(52) U.S. Cl.
CPC ........ C09J 183/04 (2013.01); G02F 1/13394 (2013.01); G02F 1/13398 (2021.01);
(Continued)

(58) Field of Classification Search
CPC ............. G02F 1/13394; G02F 1/13398; G02F 1/133305; G02F 1/1337; G02F 2202/28;
(Continued)

(56) References Cited

U.S. PATENT DOCUMENTS 7,892,394 B2    2/2011    Sano et al.
2006/0008662 A1    1/2006    Arai et al.
(Continued)

FOREIGN PATENT DOCUMENTS

CN    103305140 A    9/2013
EP    3508544 A1    7/2019
(Continued)

OTHER PUBLICATIONS

Jang, Se-Jin, et al., "P-120: Tight Bonding of Two Plastic Substrates for Flexible LCDs", SID Symposium Digest of Technical Papers, vol. 38, Issue 1, Jul. 2012. pp. 653-656.
(Continued)

Primary Examiner — Hoan C Nguyen
(74) Attorney, Agent, or Firm — Lerner David LLP

(57) ABSTRACT

A pressure-sensitive adhesive and a liquid crystal cell including the same are disclosed herein. In some embodiments, a pressure-sensitive adhesive having a storage elastic modulus of 700 kPa or more at a temperature of 25° C. and a frequency of 6 rad/sec, and a gel fraction of 35% or more, wherein the gel fraction is defined by Equation 1:

$$B/A \times 100 \quad \text{[Equation 1]}$$

wherein, A is an initial mass (g) of the pressure-sensitive adhesive, B is a mass (g) of an insoluble content after the pressure-sensitive adhesive is immersed in a solvent at 60° C. for 24 hours and then dried at 150° C. for 30 minutes. The press-sensitive adhesive is advantageous for implementation into a flexible element between upper and lower substrates
(Continued)

of a liquid crystal cell, and providing excellent electro-optical properties and appearance uniformity by minimizing defects.

15 Claims, 3 Drawing Sheets

(51) Int. Cl.
*B60J 3/00* (2006.01)
*B60J 3/06* (2006.01)
*G02F 1/1337* (2006.01)
*G02F 1/1343* (2006.01)

(52) U.S. Cl.
CPC .................. *B60J 3/007* (2013.01); *B60J 3/06* (2013.01); *G02F 1/1337* (2013.01); *G02F 1/134309* (2013.01); *G02F 2202/28* (2013.01)

(58) Field of Classification Search
CPC .............. G02F 1/134309; C09J 183/04; C09K 19/586; C09K 2219/13; B60J 3/007; B60J 3/06
See application file for complete search history.

(56) References Cited

U.S. PATENT DOCUMENTS

| | | | |
|---|---|---|---|
| 2007/0148485 A1 | 6/2007 | Kusama et al. | |
| 2009/0162617 A1* | 6/2009 | Moroishi | G02B 6/005 428/354 |
| 2012/0064276 A1* | 3/2012 | Fumoto | G02F 1/13338 428/41.5 |
| 2016/0185083 A1 | 6/2016 | Yasui et al. | |
| 2016/0237319 A1* | 8/2016 | Takarada | B32B 7/06 |
| 2017/0009115 A1 | 1/2017 | Kigami et al. | |
| 2018/0074377 A1 | 3/2018 | You et al. | |
| 2018/0284536 A1 | 10/2018 | Lee et al. | |
| 2019/0384094 A1 | 12/2019 | Lee et al. | |
| 2023/0119700 A1* | 4/2023 | Nakanishi | C09J 7/385 428/412 |

FOREIGN PATENT DOCUMENTS

| | | | | |
|---|---|---|---|---|
| JP | 2006126585 A | | 5/2006 | |
| JP | 2007197659 A | | 8/2007 | |
| JP | 2010077287 A | * | 4/2010 | ............ C09J 143/04 |
| JP | 2018507443 A | | 3/2018 | |
| JP | 2019031610 A | | 2/2019 | |
| JP | 2020517800 A | | 6/2020 | |
| JP | 2020517987 A | | 6/2020 | |
| JP | 2020139035 A | * | 9/2020 | ............ B32B 1/00 |
| KR | 20070068282 A | | 6/2007 | |
| KR | 101023839 B1 | | 3/2011 | |
| KR | 101186709 B1 | | 9/2012 | |
| KR | 20140102129 A | * | 8/2014 | |
| KR | 20140147726 A | * | 12/2014 | |
| KR | 20160078891 A | | 7/2016 | |
| KR | 20160146566 A | | 12/2016 | |
| KR | 20170079947 A | | 7/2017 | |
| KR | 20190108289 A | | 9/2019 | |
| KR | 20190110126 A | | 9/2019 | |
| TW | 200611955 A | | 4/2006 | |
| TW | 200732446 A | | 9/2007 | |
| WO | WO-2010044466 A1 | * | 4/2010 | ............ B32B 27/08 |
| WO | WO-2014192460 A1 | * | 12/2014 | ................ C09J 7/26 |
| WO | WO-2018092905 A1 | * | 5/2018 | ............ C08F 220/18 |

OTHER PUBLICATIONS

International Search Report for PCT/KR2021/008411 dated Oct. 15, 2021. 4 pgs.
Search Report dated Dec. 30, 2022 from the Office Action for Taiwanese Application No. 110124354, 2 pages.
Extended European Search Report including Written Opinion for Application No. 21833441.5 dated Nov. 28, 2023, pp. 1-8.

* cited by examiner

[Figure 1]
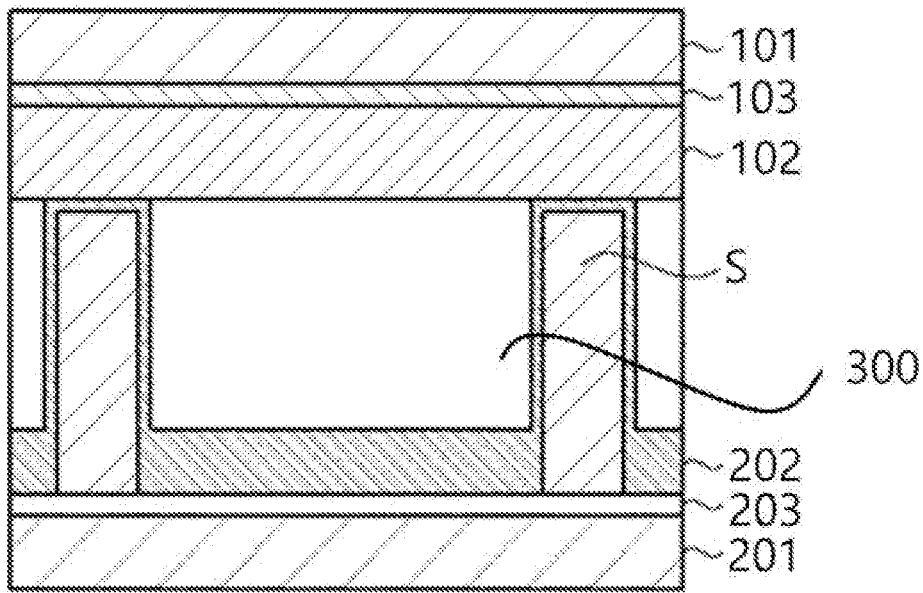
[Figure 2A]
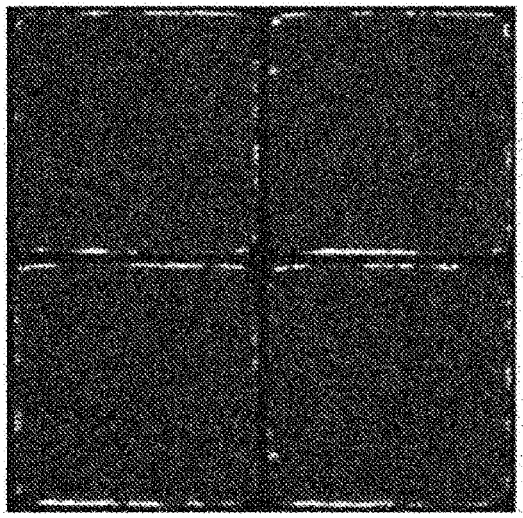
[Figure 2B]
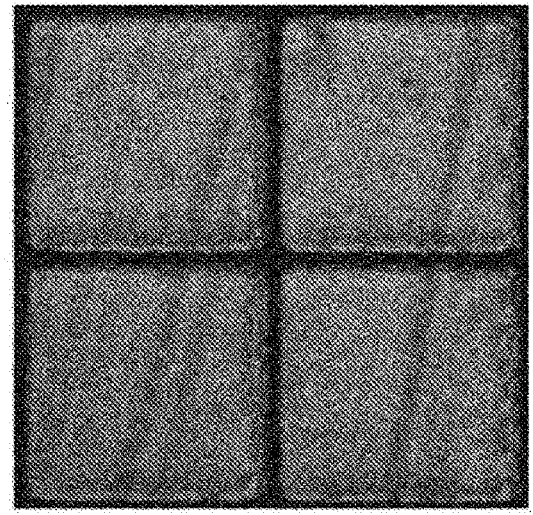

[Figure 3A]
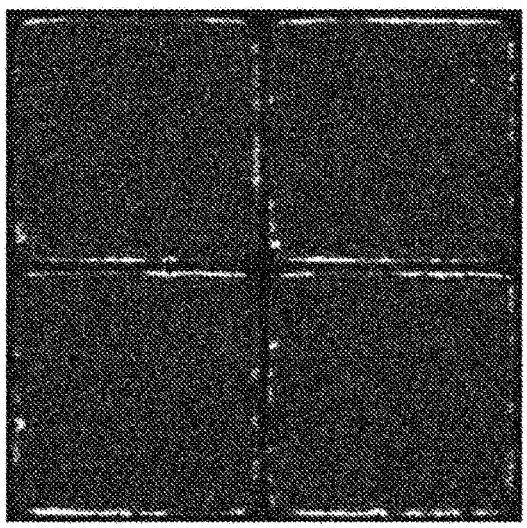
[Figure 3B]
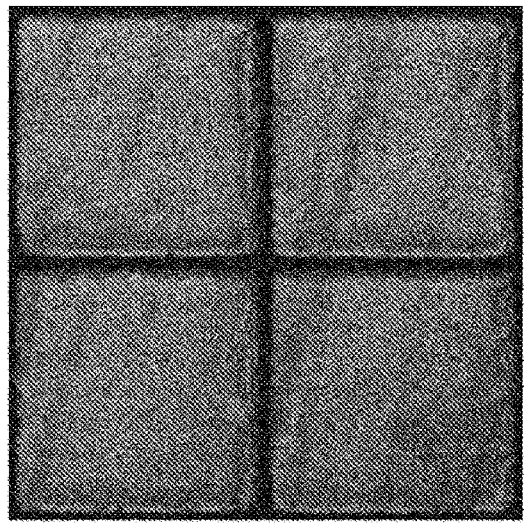
[Figure 4A]
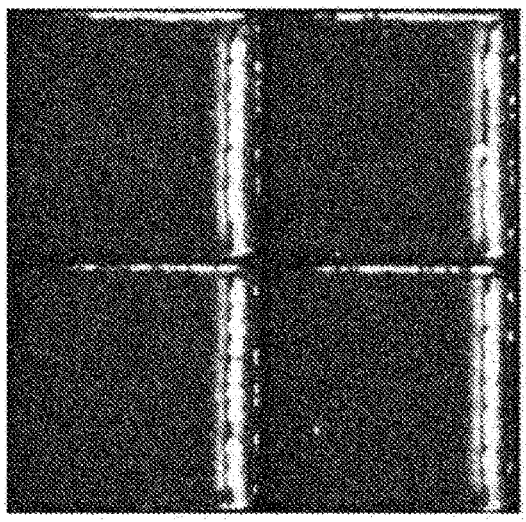
[Figure 4B]
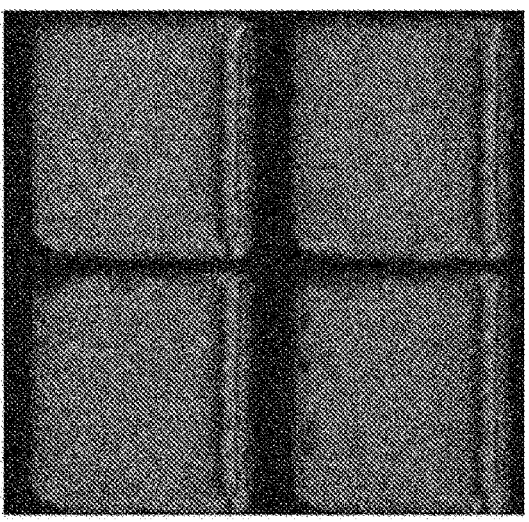

[Figure 5A] 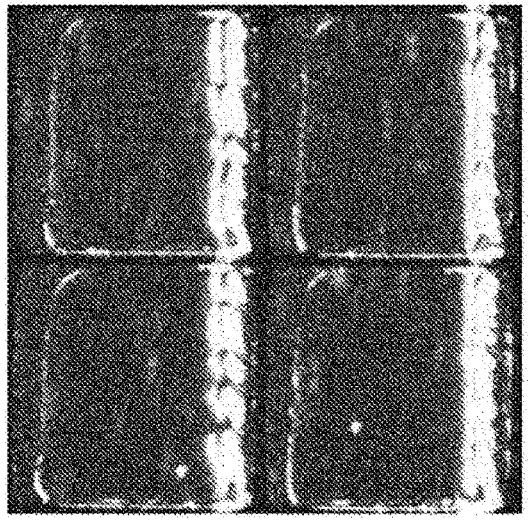
[Figure 5B] 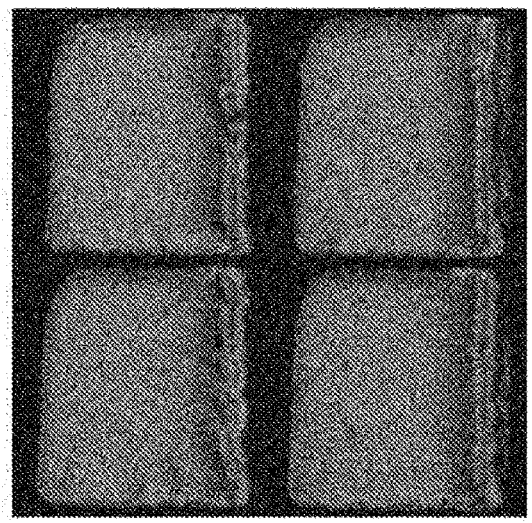

PRESSURE-SENSITIVE ADHESIVE AND LIQUID CRYSTAL CELL

CROSS-REFERENCE TO RELATED APPLICATIONS

The present application is a national phase entry under 35 U.S.C. § 371 of International Application No. PCT/KR2021/008411, filed on Jul. 2, 2021, which claims priority from Korean Patent Application No. 10-2020-0081286 dated Jul. 2, 2020, the disclosures of which are incorporated by reference herein.

TECHNICAL FIELD

The present disclosure relates to a pressure-sensitive adhesive and a liquid crystal cell.

BACKGROUND ART

For long-term stability and large-area scalability of a liquid crystal film cell using a flexible substrate, it is important to maintain a cell gap between upper and lower substrates and to impart adhesion force between upper and lower substrates.

Non-Patent Document 1 ("Tight Bonding of Two Plastic Substrates for Flexible LCDs", SID Symposium Digest, 38, pp. 653-656 (2007)) discloses a technique that an organic film pattern in the form of a column or wall with a cell gap height is formed on one substrate and fixed to the opposite substrate using an adhesive. However, in such a technique, the adhesive should be located only on the column or wall surface, but the technique of micro-stamping the adhesive on the column or wall surface has a high process difficulty; it is difficult to control the thickness and area of the adhesive; there is a high possibility that the adhesive comes out when the upper and lower substrates are laminated; and there is a risk that the adhesive is contaminated into the alignment film or liquid crystals.

BRIEF DESCRIPTION OF DRAWINGS

FIG. 1 exemplarily shows a liquid crystal cell of the present disclosure.

FIGS. 2A and 2B are a microscope image of Example 1 with and without a voltage is applied, respectively.

FIGS. 3A and 3B are a microscope image of Example 2 with and without a voltage is applied, respectively.

FIGS. 4A and 4B are a microscope image of Comparative Example 1 with and without a voltage is applied, respectively.

FIGS. 5A and 5B are a microscope image of Comparative Example 2 with and without a voltage is applied, respectively.

DISCLOSURE

Technical Problem

For maintaining a cell gap of a liquid crystal cell and securing attachment force between an upper substrate and a lower substrate, it can be considered that a spacer and an alignment film are formed on the lower substrate, a pressure-sensitive adhesive having both liquid crystal orientation force and attachment force is formed on the upper substrate, and then they are bonded together. In the case of such a liquid crystal cell, upon lamination for bonding or upon performing an autoclave as a post-process, defects in pressing or pushing of the pressure-sensitive adhesive occur, which cause a decrease in the electro-optical properties and appearance uniformity of the liquid crystal cell.

The present disclosure provides a pressure-sensitive adhesive which maintains a cell gap properly, is advantageous for implementation into a flexible element due to excellent attachment force between an upper substrate and a lower substrate, and is capable of providing a liquid crystal cell having excellent electro-optical properties and appearance uniformity by minimizing defects such as pressing or pushing of the pressure-sensitive adhesive, and a liquid crystal cell comprising the pressure-sensitive adhesive.

Technical Solution

The present disclosure relates to a pressure-sensitive adhesive. The pressure-sensitive adhesive may have a storage elastic modulus of 700 kPa or more at a temperature of 25° C. and a frequency of 6 rad/sec. The pressure-sensitive adhesive may have a gel fraction of 35% or more. The pressure-sensitive adhesive of the present disclosure has a storage elastic modulus and a gel fraction in a predetermined range, whereby even if it is applied to manufacture a liquid crystal cell, defects such as pressing or pushing of the pressure-sensitive adhesive can be minimized.

The pressure-sensitive adhesive may be optically transparent. The pressure-sensitive adhesive may have average transmittance of 80% or more, 85% or more, 90% or more, or 95% or more for a visible light region, for example, a wavelength of 380 nm to 780 nm.

The storage elastic modulus of the pressure-sensitive adhesive at a temperature of 25° C. and a frequency of 6 rad/sec may be, for example, in the range of 700 kPa to 2,000 kPa. Specifically, the storage elastic modulus may be 700 kPa or more, or 750 kPa or more, and may be 2,000 kPa or less, 1,800 kPa or less, 1,600 kPa or less, 1,400 kPa or less, or 1,200 kPa or less. When the storage elastic modulus of the pressure-sensitive adhesive is within the above range, it minimizes defects such as pressing or pushing of the pressure-sensitive adhesive at the time of being used to manufacture a liquid crystal cell, while securing attachment force, whereby it is possible to secure excellent electro-optical properties and appearance uniformity.

The gel fraction G (%) of the pressure-sensitive adhesive may be defined by Equation 1 below. The gel fraction of the pressure-sensitive adhesive may be, for example, 35% to 50%. The gel fraction may specifically be 50% or less, 45% or less, or 40% or less. When the gel fraction of the pressure-sensitive adhesive is within the above range, it minimizes defects such as pressing or pushing of the pressure-sensitive adhesive at the time of being used to manufacture a liquid crystal cell, while securing attachment force, whereby it is possible to secure excellent electro-optical properties and appearance uniformity.

$$G\ (\%) = B/A \times 100 \qquad \text{[Equation 1]}$$

In Equation 1, A is the initial mass (g) of the pressure-sensitive adhesive, and B is the mass (g) of the insoluble content after the pressure-sensitive adhesive is immersed in a solvent at 60° C. for 24 hours and dried at 150° C. for 30 minutes. The initial mass of the pressure-sensitive adhesive may mean a mass measured immediately at room temperature without being immersed in a solvent after being cured into the pressure-sensitive adhesive. In this specification, the room temperature may mean, for example, a temperature within the range of 20° C. to 30° C. or a temperature of about 25° C.

A method of controlling the storage elastic modulus and/or the gel fraction of the pressure-sensitive adhesive is known, and the method of controlling the storage elastic modulus and/or the gel fraction is not particularly limited in the present disclosure. The curing temperature for providing the pressure-sensitive adhesive may be, for example, in the range of about 140° C. to 180° C. The curing time for providing the pressure-sensitive adhesive may be, for example, 3 minutes to 15 minutes. In addition, a catalyst for curing may be used to provide a pressure-sensitive adhesive. As the catalyst, for example, a platinum-based catalyst may be used. The catalyst may be used in a range of 0.2 parts by weight to 2 parts by weight relative to 100 parts by weight of a pressure-sensitive adhesive resin. These curing conditions are only exemplary curing conditions for providing the pressure-sensitive adhesive of the present disclosure, and the scope of the present disclosure is not limited thereto.

The thickness of the pressure-sensitive adhesive may be, for example, in a range of 3 μm to 15 μm. When the thickness of the pressure-sensitive adhesive is within the above range, it may be advantageous to minimize defects such as pressing or pushing of the pressure-sensitive adhesive when used to manufacture a liquid crystal cell while securing attachment force between the upper substrate and the lower substrate.

The pressure-sensitive adhesive may be a liquid crystal orientation pressure-sensitive adhesive. The pressure-sensitive adhesive may be, for example, a vertical orientation pressure-sensitive adhesive or a horizontal orientation pressure-sensitive adhesive. In this specification, the "vertical orientation pressure-sensitive adhesive" may mean a pressure-sensitive adhesive having attachment force capable of bonding an upper substrate and a lower substrate while imparting vertical orientation force to an adjacent liquid crystal compound. In this specification, the "horizontal orientation pressure-sensitive adhesive" may mean a pressure-sensitive adhesive having attachment force capable of bonding an upper substrate and a lower substrate while imparting horizontal orientation force to an adjacent liquid crystal compound. The adjacent liquid crystal compound may have a pretilt angle with respect to the vertical orientation pressure-sensitive adhesive in a range of 80 degrees to 90 degrees, 85 degrees to 90 degrees or about 87 degrees to 90 degrees, and the adjacent liquid crystal compound may have a pretilt angle with respect to the horizontal orientation pressure-sensitive adhesive in a range of 0 degrees to 10 degrees, 0 degrees to 5 degrees or 0 degrees to 3 degrees. According to one example of the present disclosure, a vertical orientation pressure-sensitive adhesive may be used as the pressure-sensitive adhesive.

In this specification, the pretilt angle may mean an angle that a director of a liquid crystal compound forms relative to a horizontal plane with a liquid crystal orientation pressure-sensitive adhesive or alignment film in a state where no voltage is applied. In this specification, the director of the liquid crystal compound may mean an optical axis or a slow axis of a liquid crystal layer. Alternatively, when the liquid crystal compound has a rod shape, the director of the liquid crystal compound may mean a long axis direction, and when the liquid crystal compound has a discotic shape, it may mean an axis parallel to the normal direction of the disk plane. When a plurality of liquid crystal compounds having different directors exist in the liquid crystal layer, the director may be a vector sum.

As the pressure-sensitive adhesive, various types of pressure-sensitive adhesives known in the industry as so-called OCAs (optically clear adhesives) may be appropriately used. The pressure-sensitive adhesive may be different from an OCR (optically clear resin) type adhesive which is cured after the object to be attached is bonded together in that it is cured before the object to be attached is bonded together. As the pressure-sensitive adhesive, for example, an acrylic, silicone-based, epoxy-based or urethane-based pressure-sensitive adhesive may be applied.

The pressure-sensitive adhesive may comprise a cured product of a pressure-sensitive adhesive resin. In one example, the pressure-sensitive adhesive may be a silicone-based pressure-sensitive adhesive. The silicone-based pressure-sensitive adhesive may comprises, as the pressure-sensitive adhesive resin, a cured product of a curable silicone compound.

The type of the curable silicone compound is not particularly limited, and, for example, a heat-curable silicone compound or an ultraviolet-curing silicone compound may be used. The curable silicone compound may be referred to as a pressure-sensitive adhesive resin.

In one example, the curable silicone compound may be an addition-curing silicone compound.

Specifically, the addition-curing silicone compound may be exemplified by (1) an organopolysiloxane containing two or more alkenyl groups in the molecule, and (2) an organopolysiloxane containing two or more silicon-bonded hydrogen atoms in the molecule, and the like, but is not limited thereto. Such a silicone compound may form a cured product, for example, by addition reaction in the presence of a catalyst to be described below.

A more specific example of the (1) organopolysiloxane, which may be used in the present disclosure, may include a dimethylsiloxane-methylvinylsiloxane copolymer blocked with trimethylsiloxane groups at both ends of the molecular chain, methylvinylpolysiloxane blocked with trimethylsiloxane groups at both ends of the molecular chain, a dimethylsiloxane-methylvinylsiloxane-methylphenylsiloxane copolymer blocked with trimethylsiloxane groups at both ends of the molecular chain, dimethylvinylsiloxane groups blocked with dimethylvinylsiloxane groups at both ends of the molecular chain, methylvinylpolysiloxane blocked with dimethylvinylsiloxane groups at both ends of the molecular chain, a dimethylsiloxane-methylvinylsiloxane copolymer blocked with dimethylvinylsiloxane groups at both ends of the molecular chain, a dimethylsiloxane-methylvinylsiloxane-methylphenylsiloxane copolymer blocked with dimethylvinylsiloxane groups at both ends of the molecular chain, an organopolysiloxane copolymer comprising a siloxane unit represented by $R^1_2SiO_{1/2}$ and a siloxane unit represented by $R^1_2R^2SiO_{1/2}$ and a siloxane unit represented by $SiO_{4/2}$, an organopolysiloxane copolymer comprising a siloxane unit represented by $R^1_2R^2SiO_{1/2}$ and a siloxane unit represented by $SiO_{4/2}$, an organopolysiloxane comprising a siloxane unit represented by $R^1R^2SiO_{2/2}$ and a siloxane unit represented by $R^1SiO_{3/2}$ or a siloxane unit represented by $R^2SiO_{3/2}$, and a mixture of two or more of the foregoing, but is not limited thereto.

Here, $R^1$ is a hydrocarbon group other than the alkenyl group, which may be, specifically, an alkyl group such as a methyl group, an ethyl group, a propyl group, a butyl group, a pentyl group, a hexyl group or a heptyl group; an aryl group such as a phenyl group, a tolyl group, a xylyl group, or a naphthyl group; an aralkyl group such as a benzyl group or a phenetyl group; a halogen-substituted alkyl group such as a chloromethyl group, a 3-chloropropyl group or a 3,3,3-trifluoropropyl group, and the like.

In addition, here, $R^2$ is an alkenyl group, which may be, specifically, a vinyl group, an allyl group, a butenyl group, a pentenyl group, a hexenyl group or a heptenyl group, and the like.

A more specific example of the (2) organopolysiloxane, which may be used in the present invention, may include methylhydrogenpolysiloxane blocked with trimethylsiloxane groups at both ends of the molecular chain, a dimethylsiloxane-methylhydrogen copolymer blocked with trimethylsiloxane groups at both ends of the molecular chain, a dimethylsiloxane-methylhydrogensiloxane-methylphenylsiloxane copolymer blocked with trimethylsiloxane groups at both ends of the molecular chain, dimethylpolysiloxane blocked with dimethylhydrogensiloxane groups at both ends of the molecular chain, a dimethylsiloxane-methylphenylsiloxane copolymer blocked with dimethylhydrogensiloxane groups at both ends of the molecular chain, methylphenylpolysiloxane blocked with dimethylhydrogensiloxane groups at both ends of the molecular chain, an organopolysiloxane copolymer comprising a siloxane unit represented by $R^1{}_3SiO_{1/2}$, a siloxane unit represented by $R^1{}_2HSiO_{1/2}$ and a siloxane unit represented by $SiO_{4/2}$, an organopolysiloxane copolymer comprising a siloxane unit represented by $R^1{}_2HSiO_{1/2}$ and a siloxane unit represented by $SiO_{4/2}$, an organopolysiloxane comprising a siloxane unit represented by $R^1HSiO_{2/2}$ and a siloxane unit represented by $R^1SiO_{3/2}$ or a siloxane represented by $HSiO_{3/2}$, and a mixture of two or more of the foregoing, but is not limited thereto. Here, $R^1$ is a hydrocarbon group other than the alkenyl group, which may be, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenetyl group; a halogen-substituted alkyl group such as a chloromethyl group, a 3-chloropropyl group or a 3,3,3-trifluoropropyl group, and the like.

When the pressure-sensitive adhesive is a vertical orientation pressure-sensitive adhesive, the pressure-sensitive adhesive may have a surface energy of 16 mN/m or less. The lower limit of the surface energy may be, for example, 5 mN/m or more. When the pressure-sensitive adhesive is a horizontal orientation pressure-sensitive adhesive, the surface energy may be greater than 16 mN/m. The upper limit of the surface energy may be, for example, 50 mN/m or less.

The surface energy can be measured using a drop shape analyzer (KRUSS' DSA100 product). Specifically, a process that deionized water with a known surface tension is dropped on the surface of the pressure-sensitive adhesive to obtain the contact angle is repeated 5 times, thereby obtaining the average value of the resulting five contact angle values, and equally a process that diiodomethane with a known surface tension is dropped thereon to obtain the contact angle is repeated 5 times, thereby obtaining the average value of the resulting five contact angle values. Then, the surface energy was obtained by substituting a numerical value (Strom value) for the surface tension of the solvent by the Owens-Wendt-Rabel-Kaelble method using the obtained average values of the contact angles for deionized water and diiodomethane. The surface energy ($\gamma$surface) of the sample can be calculated by considering the dispersion force between nonpolar molecules and the interaction force between polar molecules ($\gamma$surface=$\gamma$dispersion+$\gamma$polar), where the ratio of the polar term ($\gamma$polar) in the surface energy $\gamma$surface can be defined as polarity of the surface.

The present disclosure also relates to a liquid crystal cell comprising a layer of the pressure-sensitive adhesive. FIG. 1 exemplarily shows a liquid crystal cell of the present disclosure. The liquid crystal cell of the present disclosure may comprise an upper substrate including an upper base film (101) and a pressure-sensitive adhesive layer (102) formed on one side of the upper base film, a lower substrate including a lower base film (201) and a spacer (S) formed on one side of the lower base film (201), and a liquid crystal layer (300) between the upper substrate and the lower substrate. Hereinafter, if there is no particular mention of the pressure-sensitive adhesive, the description of the pressure-sensitive adhesive may be applied.

The upper substrate and the lower substrate may be attached to each other by the pressure-sensitive adhesive layer. Specifically, the pressure-sensitive adhesive layer of the upper substrate and the spacer of the lower substrate may be attached to each other. When a lower alignment film is formed on the spacer of the lower substrate, a region corresponding to the spacer of the lower alignment film may be attached to the pressure-sensitive adhesive layer of the upper substrate.

As the upper base film and/or the lower base film, for example, an inorganic film such as a glass film, a crystalline or amorphous silicon film or a quartz or ITO (indium tin oxide) film, or a polymer film, and the like may be used, and the polymer film may be used in terms of implementation of a flexible element.

In one example, the upper base film and the lower base film may each be a polymer film. As an example of the polymer film, TAC (triacetyl cellulose); a COP (cyclo olefin copolymer) such as a norbornene derivative; PMMA (poly (methyl methacrylate); PC (polycarbonate); PE (polyethylene); PP (polypropylene); PVA (polyvinyl alcohol); DAC (diacetyl cellulose); Pac (polyacrylate); PES (poly ether sulfone); PEEK (polyetheretherketon); PPS (polyphenylsulfone), PEI (polyetherimide); PEN (polyethylenenaphthatlate); PET (polyethyleneterephtalate); PI (polyimide); PSF (polysulfone); PAR (polyarylate), an amorphous fluororesin, and the like may be used, without being limited thereto. A coating layer of gold, silver, or a silicon compound such as silicon dioxide or silicon monoxide, or a coating layer such as an antireflection layer may also be present on the substrate if necessary.

The lower substrate may further comprise a lower alignment film (202) formed on the spacer (S). The lower alignment film and the liquid crystal layer may be in contact with each other. The lower alignment film may be a vertical alignment film or a horizontal alignment film. In this specification, the "horizontal alignment film" may mean a layer comprising an orientational material that imparts horizontal orientation force to a liquid crystal compound present in an adjacent liquid crystal layer. In this specification, the "vertical alignment film" may mean a layer comprising an orientational material that imparts vertical orientation force to a liquid crystal compound present in an adjacent liquid crystal layer. The adjacent liquid crystal compound may have a pretilt angle with respect to the vertical alignment film in the range of 80 degrees to 90 degrees, 85 degrees to 90 degrees, or about 87 degrees to 90 degrees, and the adjacent liquid crystal compound may have a pretilt angle with respect to the horizontal alignment film in the range of 0 degrees to 10 degrees, 0 degrees to 5 degrees or 0 degrees to 3 degrees. Unlike the pressure-sensitive adhesive layer, the lower alignment film may not have an adhesive force for bonding the upper substrate and the lower substrate. In one example, the lower alignment film may have peel force close to zero with regard to the upper substrate in the state of the liquid crystal cell of FIG. 1.

The lower alignment film may be a rubbing alignment film or a photo-alignment film. The orientation direction of the alignment film may be a rubbing direction in the case of a rubbing alignment film and a direction of polarized light to be irradiated in the case of a photo-alignment film, where such an orientation direction can be confirmed by a detection method using an absorption-type linear polarizer. Specifically, the orientation direction can be confirmed by disposing an absorption-type linear polarizer on one side of the liquid crystal layer in a state where the liquid crystal compound included in the liquid crystal layer is horizontally oriented, and measuring transmittance while rotating the polarizer at 360 degrees. When the side of the liquid crystal layer or the absorption-type linear polarizer is irradiated with light in the above state and simultaneously the luminance (transmittance) is measured from the other side, the transmittance tends to be low, if the absorption axis or transmission axis coincides with the orientation direction of the liquid crystal alignment film, where the orientation direction can be confirmed through simulation reflecting the refractive index anisotropy of the applied liquid crystal compound or the like. A method of confirming the orientation direction according to the mode of the liquid crystal layer is known, and in the present disclosure, the orientation direction of the alignment film can be confirmed by such a known method.

The lower alignment film may comprise one or more selected from the group consisting of a material known to exhibit orientation ability by rubbing orientation such as a polyimide compound, a poly(vinyl alcohol) compound, a poly(amic acid) compound, a polystyrene compound, a polyamide compound and a polyoxyethylene compound, such as a (polyoxyethylene) compound, or a polyimide compound, a polyamic acid compound, a polynorbornene compound, or a material known to exhibit orientation ability by light irradiation such as a phenylmaleimide copolymer compound, a polyvinylcinnamate compound, a polyazobenzene compound, a polyethyleneimide compound, a polyvinylalcohol compound, a polyamide compound, a polyethylene compound, a polystyrene compound, a polyphenylenephthalamide compound, a polyester compound, a CMPI (chloromethylated polyimide) compound, a PVCI (polyvinylcinnamate) compound and a polymethyl methacrylate compound, but is not limited thereto.

The liquid crystal layer may comprise a liquid crystal compound. As the liquid crystal compound, any kind of liquid crystal compound may be used as long as its orientation direction may be changed by application of an external signal. For example, as the liquid crystal compound, a smectic liquid crystal compound, a nematic liquid crystal compound or a cholesteric liquid crystal compound, and the like may be used. In addition, the liquid crystal compound may be, for example, a compound having no polymerizable group or crosslinkable group so that the orientation direction thereof can be changed by application of an external action. In this specification, the term "external action" may mean any external factor that may affect the behavior of a material included in the liquid crystal layer, for example, an external voltage or the like. Therefore, the state where there is no external action may mean a state where there is no application of an external voltage or the like.

The liquid crystal layer may comprise a liquid crystal compound having positive dielectric constant anisotropy, or the liquid crystal layer may exhibit the above-mentioned dielectric constant anisotropy. The absolute value of the dielectric constant anisotropy may be appropriately selected in consideration of the purpose of the present disclosure. The term "dielectric constant anisotropy ($\Delta\varepsilon$)" may mean a difference ($\varepsilon// - \varepsilon L$) between a horizontal dielectric constant ($\varepsilon//$) and a vertical dielectric constant ($\varepsilon L$). In this specification, the term horizontal dielectric constant ($\varepsilon//$) means, in a state where a voltage is applied so that a director of a liquid crystal compound and the direction of the electric field by the applied voltage are substantially horizontal, a dielectric constant value measured along the direction of the electric field, and the vertical dielectric constant ($\varepsilon L$) means, in a state where a voltage is applied so that a director of a liquid crystal compound and the direction of the electric field by the applied voltage are substantially vertical, a dielectric constant value measured along the direction of the electric field.

The liquid crystal layer may comprise a liquid crystal compound having refractive index anisotropy ($\Delta n$) in a range of about 0.05 to 0.1, or the liquid crystal layer may exhibit the above-mentioned refractive index anisotropy. The refractive index anisotropy ($\Delta n$) mentioned in the present disclosure is a difference (ne-no) between an extraordinary refractive index (ne) and an ordinary refractive index (no), which can be confirmed using an Abbe refractometer.

The liquid crystal layer may further comprise a dichroic dye. When the liquid crystal layer comprises a dichroic dye, it may be advantageous to control light transmission characteristics. When the liquid crystal layer comprises a dichroic dye, the liquid crystal layer may be referred to as a guest host liquid crystal layer. In this specification, the term "dye" may mean a material capable of intensively absorbing and/or modifying light within the visible light region, for example, at least a part or the entire range within a wavelength range of 400 nm to 700 nm, and the term "dichroic dye" may mean a material capable of anisotropic absorption of light in at least a part or the entire range of the visible light region. Such a dye is known, for example, as an azo dye or an anthraquinone dye, but is not limited thereto.

The liquid crystal layer may further comprise a chiral agent. When the liquid crystal layer comprises a chiral agent, it may implement a twisted orientational state. The chiral agent (or chiral dopant), which can be included in the liquid crystal layer, can be used without particular limitation as long as it can induce a desired twisting without impairing liquid crystallinity, for example, nematic regularity. The chiral agent for inducing twisting in the liquid crystal compound needs to contain at least chirality in its molecular structure. The chiral agent may be exemplified by, for example, a compound having one or two or more asymmetric carbons, a compound having an asymmetric point on a heteroatom, such as a chiral amine or a chiral sulfoxide, or a compound having an optically active site with axial asymmetry, such as cumulene or binaphthol. The chiral agent may be, for example, a low molecular weight compound having a molecular weight of 1,500 or less. As the chiral agent, a commercially available chiral nematic liquid crystal, for example, a chiral dopant liquid crystal S-811 commercially available from Merck or BASF's LC756, and the like may be used.

The upper substrate may further comprise an upper electrode layer (103) formed on the upper base film (101). The upper electrode layer (103) may be disposed between the upper base film (101) and the pressure-sensitive adhesive layer (102). The lower substrate may further comprise a lower electrode layer (203) formed on the lower base film (201). The lower electrode layer (203) may be disposed between the lower base film (201) and the spacer (S). The upper electrode layer and the lower electrode layer may serve to impart application of an external action, for example, an electric field, so that a material included in the liquid crystal layer transmits or blocks incident light.

In one example, the upper electrode layer and/or the lower electrode layer may comprise a conductive polymer, a conductive metal, a conductive nanowire, or a metal oxide such as ITO (indium tin oxide), and the like, without being limited thereto. The upper electrode layer and/or the lower electrode layer may be formed by, for example, depositing the conductive polymer, conductive metal, conductive nanowire, or metal oxide such as ITO (indium tin oxide).

The spacer may be formed on the lower base film. When the lower substrate further comprises a lower electrode layer on the lower base film, the spacer may be formed on the lower electrode layer. At this time, the bottom surface part of the spacer may be in direct contact with the lower electrode layer. When the lower substrate comprises a lower alignment film, the spacer may be disposed between the lower base film and the lower alignment film. At this time, the top surface part and side parts of the spacer may be in contact with the lower alignment film.

The spacer may maintain a gap between the upper substrate and the lower substrate. A liquid crystal layer may be present in a region where a spacer does not exist between the upper substrate and the lower substrate.

The spacer may have a partition wall shape. The partition wall may partition the space between the lower substrate and the upper substrate into two or more spaces. In this specification, the space partitioned by the partition wall may be referred to as a non-partition wall part. Since there is no partition wall in the non-partition wall part, other films or other layers present in the lower part may be exposed. For example, the lower electrode layer may be exposed in the non-partition wall part. The lower alignment film may cover the partition wall parts and the lower electrode layer exposed to the non-partition wall part between the partition wall parts. In the liquid crystal cell in which the upper substrate and the lower substrate are bonded together, the lower alignment film present on the upper part of the partition walls of the lower substrate and the pressure-sensitive adhesive of the upper substrate may be in contact with each other.

A liquid crystal compound and the above-described additives, for example, a dichroic dye, a chiral agent, and the like may be present in the region corresponding to the non-partition wall part. The shape of the non-partition wall part is not particularly limited, which may be applied without limitation so as to have, for example, a circle, an ellipse, or other polygonal polyhedrons. According to one example of the present disclosure, the partition wall layer may have, for example, a rectangular shape.

The partition wall may comprise a curable resin. The type of the curable resin is not particularly limited, and for example, a thermosetting resin or photocurable resin, for example, an ultraviolet curable resin may be used.

As the thermosetting resin, for example, a silicone resin, a silicon resin, a furan resin, a polyurethane resin, an epoxy resin, an amino resin, a phenol resin, a urea resin, a polyester resin or a melamine resin, and the like may be used, without being limited thereto.

As the ultraviolet curable resin, typically, an acrylic polymer, for example, a polyester acrylate polymer, a polystyrene acrylate polymer, an epoxy acrylate polymer, a polyurethane acrylate polymer or a polybutadiene acrylate polymer, a silicone acrylate polymer or an alkyl acrylate polymer, and the like may be used, without being limited thereto.

According to one example of the present disclosure, the partition wall part may be formed using an acrylic polymer, more specifically, a polyester-based acrylate polymer, but is not limited thereto.

In one example, the partition wall-shaped spacer may be formed by patterning by photolithography. The photolithography process may comprise a process of applying a curable resin composition on a lower substrate and then irradiating it with ultraviolet rays through a pattern mask. The pattern mask may be patterned into an ultraviolet transmitting region and an ultraviolet blocking region. The photolithography process may further comprise a process of washing the curable resin composition irradiated with ultraviolet rays. The region irradiated with ultraviolet rays is cured, and the region not irradiated with ultraviolet rays remains in a liquid phase, thereby being removed through a washing process, it can be patterned into a partition wall shape. In the photolithography process, a release treatment may be performed on the pattern mask or a release paper may be placed between the layer of the resin composition and the pattern mask, in order to easily separate the resin composition and the pattern mask after ultraviolet irradiation.

In the partition wall part (spacer), the width (line width), spacing (pitch), thickness, or area ratio to the upper substrate or the lower substrate may be appropriately selected within a range that does not impair the purpose of the present disclosure. For example, the width (line width) of the partition wall part may be in the range of 1 µm to 500 µm or in the range of 5 µm to 50 µm. The spacing (pitch) of the partition walls may be in the range of 10 µm to 5000 µm or in the range of 100 µm to 3000 µm, or in the range of 100 µm to 1000 µm. The thickness of the partition wall part may be appropriately selected in consideration of a desired cell gap. The thickness of the partition wall part may be, for example, in the range of 1 µm to 30 µm or 3 µm to 20 µm. The area of the partition wall part may be in the range of about 0.1% to 50% relative to 100% of the total area of the upper substrate or the lower substrate. The area is related to the adhesive force between the upper substrate and the lower substrate, which may be in the range of about 10% to 20% relative to 100% of the total area of the upper substrate or the lower substrate of the partition wall part.

The driving mode of the liquid crystal cell may be appropriately selected as needed. The driving mode of the liquid crystal cell includes, for example, an ECB (electrically controlled birefringence) mode, a TN (twisted nematic) mode, an STN (super twisted nematic) mode, an RTN (reverse twisted nematic) mode, an RSTN (reverse super twisted nematic) mode, an HAN (hybrid aligned nematic) mode, a twisted HAN (twisted hybrid aligned nematic) mode, a super twisted HAN (super twisted hybrid aligned nematic) mode, an IPS (in-plane switching) mode, a VA (vertical alignment) mode, and the like. Depending on the desired driving mode of the liquid crystal cell, the type of the liquid crystals, the type of the alignment film, the type of the additives, and the like may be appropriately selected.

The liquid crystal cell may switch the orientational state of the liquid crystal layer according to an applied voltage. In one example, in a state where no voltage is applied to the liquid crystal cell, the liquid crystal layer may have a first orientational state, and in a state where a voltage is applied to the liquid crystal cell, the liquid crystal layer may have a second orientational state different from the first orientational state. The first orientational state and/or the second orientational state may be exemplified by a horizontal orientational state, a vertical orientational state, a twist orientational state, an inclined orientational state, a hybrid orientational state, and the like.

In this specification, the "horizontal orientational state" is a state where the director of the liquid crystal compound in the liquid crystal layer is arranged substantially parallel to the plane of the liquid crystal layer, where for example, the angle formed by the director with respect to the plane of the liquid crystal layer may be, for example, in the range of about −10 degrees to 10 degrees or −5 degrees to 5 degrees, or may form approximately about 0 degrees.

In this specification, the "vertical orientational state" is a state where the director of the liquid crystal compound in the liquid crystal layer is arranged substantially perpendicular to the plane of the liquid crystal layer, where for example, the angle formed by the director with respect to the plane of the liquid crystal layer may be, for example, in the range of about 80 degrees to 100 degrees or 85 degrees to 95 degrees, or may form approximately about 90 degrees.

In this specification, the "twisted orientational state" may mean a spiral structure in which the directors of the liquid crystal compounds in the liquid crystal layer are twisted along an imaginary spiral axis to form a layer and oriented. The twist orientational state may be implemented in a vertical, horizontal or oblique orientational state, and that is, the vertical twist orientational mode is a state where individual liquid crystal compounds are twisted along a spiral axis in a vertically oriented state to form a layer; the horizontal twist orientational mode is a state where individual liquid crystal compounds are twisted along a spiral axis in a horizontally oriented state to form a layer; and the oblique twist orientational mode is a state where individual liquid crystal compounds are twisted along a spiral axis in an obliquely oriented state to form a layer.

In this specification, the "hybrid orientational state" may mean an orientational state in which a tilt angle, which is an angle formed by a director of a liquid crystal compound in the liquid crystal layer with respect to the plane of the liquid crystal layer, gradually increases or decreases along the thickness direction of the liquid crystal layer.

The present disclosure relates to an optical element further comprising the liquid crystal cell and other optical members. The other optical members may be exemplified by a polarizer or a liquid crystal cell other than the liquid crystal cell. As the polarizer, a reflection type or absorption type polarizer, and the like may be exemplified, and a circular polarizer, an elliptical polarizer or a linear polarizer, and the like may be exemplified. The polarizer may be present on one side of the liquid crystal cell or may also be present on both sides of the liquid crystal cell. As the liquid crystal cell other than the liquid crystal cell, the same or different liquid crystal cell may also be overlapped to implement a double cell.

The optical element may further comprise, as other components, known components such as a hard coating layer, an antireflection layer, a layer including a dye having an NIR (near-infrared) cut function and a retardation film.

The liquid crystal cell of the present disclosure maintains a proper cell gap and is advantageous for realization as a flexible element due to excellent adhesive force between the upper substrate and the lower substrate, and minimizes defects such as pressing or pushing of the pressure-sensitive adhesive, whereby it may have excellent electro-optical properties and appearance uniformity.

The present disclosure also relates to a use of the liquid crystal cell. The liquid crystal cell may be used, for example, in eyewear such as sunglasses or eyewear for AR (augmented reality) or VR (virtual reality), an exterior wall of a building or a sunroof for a vehicle, and the like. In one example, the present disclosure relates to a sunroof comprising the liquid crystal cell. The sunroof may be a vehicle sunroof. The present disclosure also relates to a vehicle comprising a vehicle body in which at least one or more openings are formed, and the liquid crystal cell or the sunroof mounted in the opening.

The liquid crystal cell of the present disclosure may be included in a light modulation device and used. The light modulation device may be exemplified by a smart window, a window protection film, a flexible display element, an active retarder for displaying a 3D image or a viewing angle control film, and the like, but is not limited thereto. A method of configuring such a light modulation device is not particularly limited, and a conventional method may be applied as long as the liquid crystal cell is used.

Effects of Invention

The present disclosure provides a pressure-sensitive adhesive which maintains a cell gap properly, is advantageous for implementation into a flexible element due to excellent adhesive force between an upper substrate and a lower substrate, and is capable of providing a liquid crystal cell having excellent electro-optical properties and appearance uniformity by minimizing defects such as pressing or pushing of the pressure-sensitive adhesive, and a liquid crystal cell comprising the pressure-sensitive adhesive.

MODE FOR INVENTION

Hereinafter, the present disclosure will be described in detail through examples according to the present disclosure, but the scope of the present disclosure is not limited by the following examples.

Measurement Example 1. Measurement of Storage Elastic Modulus

The storage elastic modulus of the pressure-sensitive adhesive was measured using TA's ARES G2, Rheometer. As described in Examples and Comparative Examples, a layer of a pressure-sensitive adhesive is formed on a fluorine release film and then the fluorine release film is peeled off to take the layer of the pressure-sensitive adhesive. After laminating the layer of the pressure-sensitive adhesive having a width×length area of 5 mm×5 mm to a thickness of 1000 μm, it was placed on an Al plate having a thickness of 8 mm and the storage elastic modulus was measured. The storage elastic modulus values were recorded under conditions of a temperature of 25° C. and a frequency sweep of 6 rad/sec (about 1 Hz).

Measurement Example 2. Measurement of Gel Fraction

As described in Examples and Comparative Examples, a layer of a pressure-sensitive adhesive is formed on a fluorine release film and then the fluorine release film is peeled off to take the layer of the pressure-sensitive adhesive. Immediately after taking the layer of the pressure-sensitive adhesive, the initial mass (g) A of the pressure-sensitive adhesive was measured at room temperature 25° C. In addition, after taking the layer of the pressure-sensitive adhesive, the layer of the pressure-sensitive adhesive was immersed in a toluene solvent at 60° C. for 24 hours, and then dried at 150° C. for 30 minutes using a drying oven, and then the mass (g) B of the insoluble content was measured. The gel fraction was calculated as in Equation 1 below.

$$B/A \times 100 \quad \text{[Equation 1]}$$

Measurement Example 3. Transmittance Measurement

To one side of the lower substrate of each liquid crystal cell prepared in Examples and Comparative Examples, a lower polarizer was attached, and an upper polarizer was attached to one side of the upper substrate of the liquid crystal cell. Both the upper polarizer and the lower polarizer had single transmittance of about 45%, and were attached to the liquid crystal cell via an OCA (LGC, V310). In the sample, the absorption axis of the lower polarizer is parallel to the orientation direction (rubbing direction) of the lower substrate, and the absorption axis of the upper polarizer forms approximately 90 degrees with the lower polarizer.

For the optical element, the transmittance in a state where no voltage was applied to the liquid crystal cell and the transmittance in a state where a voltage of 60V was applied were measured using a haze meter (NDH-5000SP, Cesco).

Example 1

Manufacture of Upper Substrate

An OCA type pressure-sensitive adhesive resin (KR3700, ShinEtsu) was mixed with a toluene solvent so that the solid content was 25 wt %, and 1 part by weight of a platinum catalyst (CAT-PL-56, ShinEtsu) was added relative to 100 parts by weight of the pressure-sensitive adhesive resin to prepare a pressure-sensitive adhesive composition.

The pressure-sensitive adhesive composition was coated on a fluorine release film (FSC6, Nippa) by bar coating, and then heated at a temperature of 140° C. for 5 minutes, thereby obtaining a pressure-sensitive adhesive having a final thickness of about 10 μm. Through the heating, the drying of the solvent and the curing reaction through catalysis occur simultaneously. The pressure-sensitive adhesive layer was laminated on the ITO layer of a PET-ITO film to manufacture an upper substrate. The PET-ITO film is a film in which an ITO (indium tin oxide) layer is deposited to a thickness of about 30 nm on a highly stretched PET (polyethyleneterephtalate) film (OCF, SKC), which has a total thickness of about 145 μm. The manufactured upper substrate has a structure laminated in the order of PET film/ITO layer/pressure-sensitive adhesive layer/release film.

Manufacture of Lower Substrate

An acrylic resin composition (trade name: KAD-03, manufacturer: MINUTA Tech) was coated on the ITO layer of the same PET-ITO film as used in the upper substrate, and then patterned in a rectangular shape using a photolithography method, thereby forming a partition wall-shaped spacer. The height of the partition wall shape is 8 μm, the pitch (interval between two opposing sides of the rectangle) is 350 μm, and the line width is 15 μm. Subsequently, a vertical alignment film (5661LB3, Nissan) was coated on the spacer to about 300 nm and then rubbed with a rubbing cloth to manufacture a lower substrate.

Bonding of Liquid Crystal Cell

The fluorine release film was peeled off from the upper substrate. The liquid crystal composition was coated on the alignment film of the lower substrate, and then laminated into the upper substrate to bond the liquid crystal cell together. The liquid crystal composition is a mixture of a liquid crystal compound (SHN-7002XX T12, JNC) having a refractive index anisotropy (Δn) of 0.094 and negative dielectric constant anisotropy and a chiral additive (S811, Merck). The prepared liquid crystal cell is a reverse TN mode liquid crystal cell with a cell gap of 8 μm, and the chiral pitch is 20 μm.

Example 2

A liquid crystal cell was manufactured in the same manner as in Example 1, except that the curing conditions of the pressure-sensitive adhesive in Example 1 were changed to a temperature of 140° C. and 3 minutes.

Comparative Example 1

A liquid crystal cell was manufactured in the same manner as in Example 1, except that the curing conditions of the pressure-sensitive adhesive in Example 1 were changed to a temperature of 140° C. and 1 minute.

Comparative Example 2

A liquid crystal cell was manufactured in the same manner as in Example 1, except that the curing conditions of the pressure-sensitive adhesive in Example 1 were changed to a temperature of 130° C. and 3 minutes.

Table 1 below shows the storage elastic moduli and gel fraction values of the pressure-sensitive adhesives of Examples 1 and 2 and Comparative Examples 1 and 2, and transmittance values according to the presence or absence of voltage application of the liquid crystal cells. FIGS. 2A through 5B are optical microscope images of Examples 1 and 2 and Comparative Examples 1 and 2, respectively (100 magnification). FIGS. 2A, 3A, 4A, and 5A are images of 0V, and FIGS. 2B, 3B, 4B, and 5B are images upon application of a voltage of 60V.

As shown in Table 1, Examples 1 and 2 show lower transmittance at 0V and higher transmittance at 60V compared to Comparative Examples 1 and 2, so it can be said to have excellent transmittance variable characteristics.

In the case of Comparative Examples 1 and 2, regions without liquid crystal are generated as the pressure-sensitive adhesive is pressed toward the partition wall, and they are not driven in a voltage-on state and exist in a dark state. For this reason, the transmittance and uniformity of the liquid crystal cells are deteriorated in the voltage-on state. In addition, in the case of Comparative Examples 1 and 2, damage occurs on the surface of the pressure-sensitive adhesive while the partition walls move, whereby light leakage due to abnormality in liquid crystal orientation occurs in the voltage-off state. For this reason, the transmittance of the liquid crystal cell is increased in the voltage-off state.

TABLE 1

|  |  | Pressure-sensitive adhesive characteristics | | Electro-optical characteristics | |
| --- | --- | --- | --- | --- | --- |
|  |  | Storage elastic modulus (kPa) | Gel fraction (%) | T [0 V] | T [60 V] |
| Example | 1 | 1,072 | 35.1 | 0.24 | 26.94 |
|  | 2 | 770 | 37.3 | 0.23 | 26.31 |
| Comparative | 1 | 617 | 37.3 | 0.44 | 23.17 |
| Example | 2 | 350 | 30.7 | 0.51 | 21.79 |

EXPLANATION OF REFERENCE NUMERALS

101: upper base film, 201: lower base film, 102: pressure-sensitive adhesive layer, 202: lower alignment film, 103: upper electrode layer, 203: lower electrode layer, S: spacer, 300: liquid crystal layer

The invention claimed is:

1. A pressure-sensitive adhesive having a storage elastic modulus of 700 kPa or more at a temperature of 25° C. and a frequency of 6 rad/sec, and a gel fraction of 35% or more, wherein the gel fraction is defined by Equation 1:

$$B/A \times 100 \qquad \text{[Equation 1]}$$

wherein, A is an initial mass (g) of the pressure-sensitive adhesive, B is a mass (g) of an insoluble content after the pressure-sensitive adhesive is immersed in a solvent at 60° C. for 24 hours and then dried at 150° C. for 30 minutes.

2. The pressure-sensitive adhesive according to claim 1, wherein the storage elastic modulus is in a range of 700 kPa to 2000 kPa.

3. The pressure-sensitive adhesive according to claim 1, wherein the gel fraction is in a range of 35% to 50%.

4. The pressure-sensitive adhesive according to claim 1, wherein the pressure-sensitive adhesive is a silicone-based pressure-sensitive adhesive.

5. The pressure-sensitive adhesive according to claim 1, wherein the pressure-sensitive adhesive is a liquid crystal orientational pressure-sensitive adhesive.

6. A liquid crystal cell comprising:
an upper substrate including an upper base film and a layer of the pressure-sensitive adhesive of claim 1 formed on one side of the upper base film,
a lower substrate including a lower base film and a spacer formed on one side of the lower base film, and
a liquid crystal layer between the upper substrate and the lower substrate.

7. The liquid crystal cell according to claim 6, wherein the upper base film and the lower base film are each a polymer film.

8. The liquid crystal cell according to claim 6, wherein the layer of pressure-sensitive adhesive of the upper substrate and the spacer of the lower substrate are present in are attached.

9. The liquid crystal cell according to claim 6, wherein the lower substrate further comprises a lower alignment film formed on the spacer.

10. The liquid crystal cell according to claim 6, wherein the upper substrate further comprises an upper electrode layer formed on the upper base film, and the lower substrate further comprises a lower electrode layer formed on the lower base film.

11. The liquid crystal cell according to claim 6, wherein the spacer comprises a curable resin.

12. The liquid crystal cell according to claim 6, wherein the spacer is a partition wall spacer.

13. The liquid crystal cell according to claim 6, wherein the spacer has a line width in a range of 5 μm to 50 μm, and the spacer has a height in a range of 3 μm to 20 μm.

14. The liquid crystal cell according to claim 6, wherein the upper substrate and the lower substrate are spaced apart by the spacer, and the liquid crystal layer is present in a region where the spacer does not exist between the upper substrate and the lower substrate.

15. A sunroof comprising the liquid crystal cell of claim 6.

* * * * *